United States Patent
Min et al.

(10) Patent No.: US 10,303,296 B2
(45) Date of Patent: May 28, 2019

(54) DEVICE FOR SENSING TOUCH

(71) Applicants: Samsung Display Co., Ltd, Yongin-si, Gyeonggi-do (KR); Sogang University Research Foundation, Seoul (KR)

(72) Inventors: Kyung Youl Min, Yongin-si (KR); Jun Yong Song, Yongin-si (KR); Gil Cho Ahn, Seoul (KR)

(73) Assignee: Samsung Display Co., Ltd. (KR)

( * ) Notice: Subject to any disclaimer, the term of this patent is extended or adjusted under 35 U.S.C. 154(b) by 284 days.

(21) Appl. No.: 15/227,307

(22) Filed: Aug. 3, 2016

(65) Prior Publication Data
US 2017/0108990 A1 Apr. 20, 2017

(30) Foreign Application Priority Data

Oct. 16, 2015 (KR) ........................ 10-2015-0144860

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01)
(58) Field of Classification Search
CPC ............................... G06F 3/0418; G06F 3/044
See application file for complete search history.

(56) References Cited

U.S. PATENT DOCUMENTS

| 7,948,245 B2 | 5/2011 | Hargreaves et al. |
| 8,624,870 B2 | 1/2014 | Joharapurkar et al. |
| 2013/0141372 A1* | 6/2013 | Kang ...................... G06F 3/041 345/173 |
| 2015/0029141 A1* | 1/2015 | Jo ........................... G06F 3/044 345/174 |

FOREIGN PATENT DOCUMENTS

| KR | 10-1398322 B1 | 5/2014 |
| KR | 10-1514533 B1 | 4/2015 |

* cited by examiner

*Primary Examiner* — Amare Mengistu
*Assistant Examiner* — Jennifer L Zubajlo
(74) *Attorney, Agent, or Firm* — Innovation Counsel LLP

(57) ABSTRACT

Disclosed is a device for sensing touch. The device for sensing touch includes: a plurality of electrodes; and a sensing circuit connected with the plurality of electrodes by a plurality of output channels, which is provided so as to correspond to the plurality of electrodes, respectively, and configured to sense a variation of capacitance of the plurality of electrodes from the plurality of output channels, in which the sensing circuit simultaneously senses output data output from a first output channel, a second output channel, a third output channel, and a fourth output channel among the plurality of output channels, the second output channel is adjacent to the first output channel, and the fourth output channel is adjacent to the third output channel, and the first to fourth output channels are connected to an input terminal of a comparing unit including a first input node and a second input node.

12 Claims, 11 Drawing Sheets

DEVICE FOR SENSING TOUCH

CROSS-REFERENCE TO RELATED APPLICATION

This application claims priority to and the benefit of Korean Patent Application No. 10-2015-0144860 filed on Oct. 16, 2015 in the Korean Intellectual Property Office, the entire content of which is incorporated herein by reference in its entirety.

BACKGROUND

1. Field

The present disclosure relates to a device for sensing a touch.

2. Description of the Related Art

A device for sensing a touch, such as a touch screen and a touch pad, is an input device. This type of touch-input device is often incorporated into a display device to provide an intuitive input method to a user, and has been widely applied to various electronic devices, such as a mobile phone.

Particularly, fueled by a recent increase in demand for smart phones, the rate at which touch screen technology is evolving has been gradually increasing to accommodate various types of input methods in a limited form factor.

A touch screen applied to a portable device may be generally divided into a resistive touch screen and a capacitive touch screen according to how a touch input is sensed. Among them, the capacitive touch screen has an advantage in that it has a relatively long lifespan and various input methods and gestures may be easily implemented. Hence, the popularity of capacitive touch screen has been rising.

Particularly, in the capacitive touch screen, it is easy to implement a multi-touch interface compared to the resistive touch screen. This is yet another reason for which the capacitive touch screen is widely applied.

The capacitive touch screen includes a plurality of electrodes connected to a plurality of sensing channels, and senses a touch input based on a change in capacitance generated in each electrode by the touch input.

SUMMARY OF THE INVENTIVE CONCEPT

In one embodiment, there is provided a device for sensing a touch, which has an improved Signal to Noise Ratio (SNR).

An exemplary embodiment of the present invention provides aa device for sensing a touch, including: a plurality of electrodes; and a sensing circuit connected with the plurality of electrodes by a plurality of output channels, which is provided so as to correspond to the plurality of electrodes, respectively, and configured to sense a variation of capacitance of the plurality of electrodes from the plurality of output channels, in which the sensing circuit simultaneously senses output data output from a first output channel, a second output channel, a third output channel, and a fourth output channel among the plurality of output channels, the second output channel is adjacent to the first output channel, and the fourth output channel is adjacent to the third output channel, and the first to fourth output channels are connected to an input terminal of a comparing unit including a first input node and a second input node.

The sensing circuit may further include a plurality of first capacitors, and the plurality of first capacitors may be provided between a first node of the first output channel and the input terminal of the comparing unit, between a second node of the second output channel and the input terminal of the comparing unit, between a third node of the third output channel and the input terminal of the comparing unit, and between a fourth node of the fourth output channel and the input terminal of the comparing unit.

An operation polarity of a constant current source supplied to the first node may be opposite to an operation polarity of a constant current source supplied to the second node.

An operation polarity of a constant current source supplied to the first node may be opposite to an operation polarity of a constant current source supplied to the third node.

The first output channel and the third output channel may be connected to the first input node of the comparing unit, and the second output channel and the fourth output channel may be connected to the second input node of the comparing unit.

A first voltage corresponding to a difference between a voltage of the first node and a voltage of the third node may be input into the first input node, and a second voltage corresponding to a difference between a voltage of the second node and a voltage of the fourth node may be input into the second input node.

A signal corresponding to a difference between the first voltage and the second voltage may be output to an output terminal of the comparing unit.

The sensing circuit may further include a plurality of second capacitors, and the plurality of second capacitors may be provided between the first input node and the output terminal of the comparing unit and between the second input node and the output terminal of the comparing unit, and an output signal of the output terminal may be amplified by a ratio of capacitance of the first capacitor to capacitance of the second capacitor.

The sensing circuit may further include an amplifier for amplifying the output signal of the comparing unit at the output terminal of the comparing unit.

When the plurality of output channels is divided into a first group and a second group, which are targets of the first output channel and the second output channel, and a third group and a fourth group, which are targets of the third output channel and the fourth output channel, the sensing circuit may sense the plurality of output channels included in the first group and the plurality of output channels included in the third group, and then sense the second group and the fourth group.

The sensing circuit may sequentially sense the plurality of output channels included in the first group and the third group so that the output channel sensed as the second output channel during the $i^{th}$ sensing (i is a natural number) is sensed as the first output channel during the $i+1^{th}$ sensing.

The sensing circuit may sequentially sense the plurality of output channels included in the second group and the fourth group so that the output channel sensed as the fourth output channel during the $i^{th}$ sensing (i is a natural number) is sensed as the third output channel during the $i+1^{th}$ sensing.

The sensing circuit may sense the plurality of output channels included in the second group and the fourth group in a reverse order so that the output channel sensed as the third output channel during the $i^{th}$ sensing (i is a natural number) is sensed as the fourth output channel during the $i+1^{th}$ sensing.

According to the exemplary embodiment, it is possible to improve accuracy of the detection of a touch by improving a Signal To Noise Ratio (SNR), and also improve accuracy of the detection of an event having a small variation of capacitance, such as hovering.

BRIEF DESCRIPTION OF THE DRAWINGS

Example embodiments will now be described more fully with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE INVENTION

Figure 1:
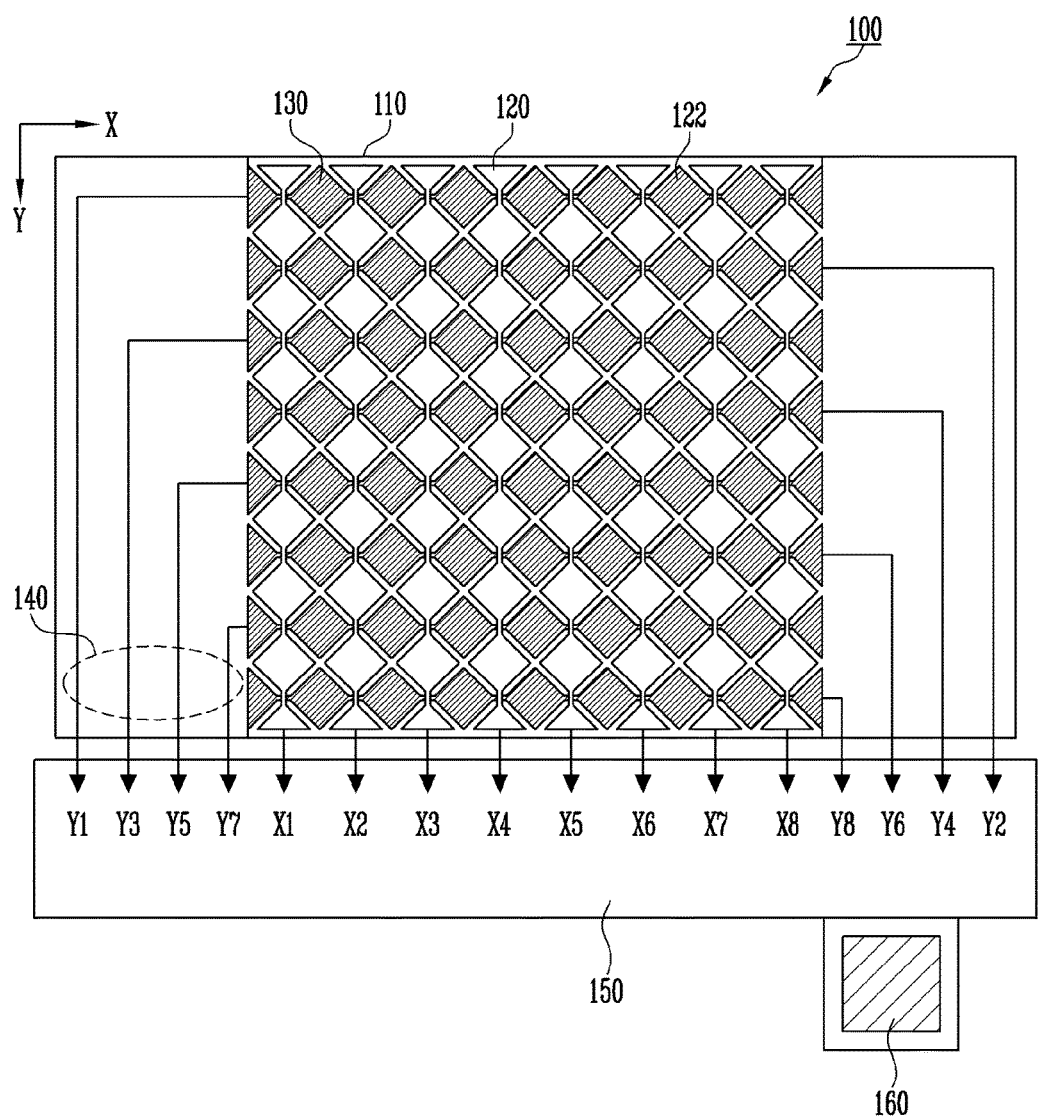
FIG. 1 is a diagram illustrating a structure of a touch sensing device according to an exemplary embodiment of the present inventive concept.

The inventive concept will be described with reference to the accompanying drawings based on a specific embodiment in which the inventive concept may be carried out as an example. The embodiment will be sufficiently described in detail enough to carry out the present invention by those skilled in the art. It should be understood that various embodiments of the present invention are different from each other, but need not to be mutually exclusive. For example, a specific figure, a structure, and a characteristic described herein may be implemented as another embodiment without departing from a spirit and a scope of the present invention in relation to an embodiment. Further, it should be understood that a position or a displacement of an individual constituent element in each disclosed embodiment may be changed without departing from the spirit and the scope of the present inventive concept. Accordingly, a detailed description below is not taken as a limited meaning, and is defined by the accompanying claims together with all equivalent scopes to the claims if the scope of the inventive concept is appropriately described. Like reference numerals in the drawing denote the same or similar function throughout several aspects.

Hereinafter, exemplary embodiments of the inventive concept will be described with reference to the accompanying drawings in detail so that those skilled in the art may easily carry out the inventive concept.

FIG. 1 is a diagram illustrating a structure of a touch sensing device according to an exemplary embodiment of the present inventive concept.

Referring to FIG. 1, a touch sensing device 100 according to an exemplary embodiment includes a transparent base substrate 110, a plurality of electrodes 120 and 130 formed on the base substrate 110, wiring patterns 140 connected to the plurality of first electrodes 130 and second electrodes 120, and a control unit 160 electrically connected with the plurality of first and second electrodes 130 and 120 through the wiring patterns 140.

As illustrated in FIG. 1, a circuit board 150 provided with the control unit 160 may be provided at a lower end of the base substrate 110, and each sensing channel terminal (not illustrated) of the control unit 160 may be electrically connected with the plurality of first and second electrodes 130 and 120 through respective output channels X1 to X8 and Y1 to Y8 of the wiring patterns 140.

The plurality of first and second electrodes 130 and 120 may be formed of a transparent conductive material, such as ITO, ZnO, and CNT, and may have a predetermined pattern so as to enable the control unit 160 to determine a touch input based on sensing signals generated by the plurality of first and second electrodes 130 and 120.

A unit electrode 122 that make up the plurality of first and second electrodes 130 and 120 may have a rhombus shape or a diamond shape as illustrated in FIG. 1. The unit electrode 122 having a rhombus shape or a diamond shape may be connected to an adjacent unit electrode 122 in a horizontal or vertical direction to form the plurality of first and second electrodes 130 and 120.

Hereinafter, for convenience of the description, the plurality of electrodes extended in the horizontal direction (X-axis direction) will be expressed as first electrodes 130 and the plurality of electrodes extended in the vertical direction (Y-axis direction) will be expressed as second electrodes 120.

The first electrodes 130 and the second electrodes 120 may have a shape in which the unit electrodes 122 having the same shape are connected in the horizontal or vertical direction, and may also be disposed on different layers or the same layer. The connections are not explicitly illustrated in FIG. 1.

A space between the first electrodes 130 is filled by the second electrode 120, and when all of the first electrode 130 and the second electrode 120 are disposed on the same layer, in order to electrically separate the two electrodes at a crossing point of the first electrode 130 and the second electrode 120, a bridge structure, in which a predetermined insulating material is disposed at the crossing point, may be applied.

Each first electrode 130 and each second electrode 120 may be connected to a separate wiring pattern as illustrated in FIG. 1.

That is, as illustrated in FIG. 1, when the touch sensing device 100 includes eight first electrodes 130 and eight second electrodes 120, a total of 16 wiring patterns 140 is provided according to a bezel area of the base substrate 110, and the control unit 160 may include at least 16 sensing channels so as to be connected to the respective wiring patterns 140.

The control unit 160 may include a sensing circuit, which is electrically connected with the plurality of electrodes 120 and 130 through the sensing channels provided in the control unit 160 and the output channels X1 to X8 and Y1 to Y8 of the wiring patterns 140, and obtains a sensing signal. Although only 16 output channels are shown in FIG. 1, this is not a limitation of the inventive concept.

The sensing signal may be a change in self-capacitance generated between a touch object and a space between the first electrode 130 and the second electrode 120, or an electric signal that is a change in mutual capacitance between the first electrode 130 and the second electrode 120 caused by a touch object.

When a change in mutual capacitance is sensed, a driving circuit for applying a driving signal to any one of the first electrode 130 and the second electrode 120 may be included in the control unit 160.

The control unit 160 may measure a change in capacitance generated by the plurality of electrodes 130 and 120 in the form of a voltage. The change in capacitance measured as a size of voltage may be converted into a digital signal by an Analog-to-Digital Converter (ADC) or a Time-to-Digital Converter (TDC), and the control unit 160 may determine coordinates of a touch input, a multi-touch, a gesture, and the like by using the converted digital signal.

Particularly, the touch sensing device according to the inventive concept may adopt the self-capacitance scheme.

Figure 2:
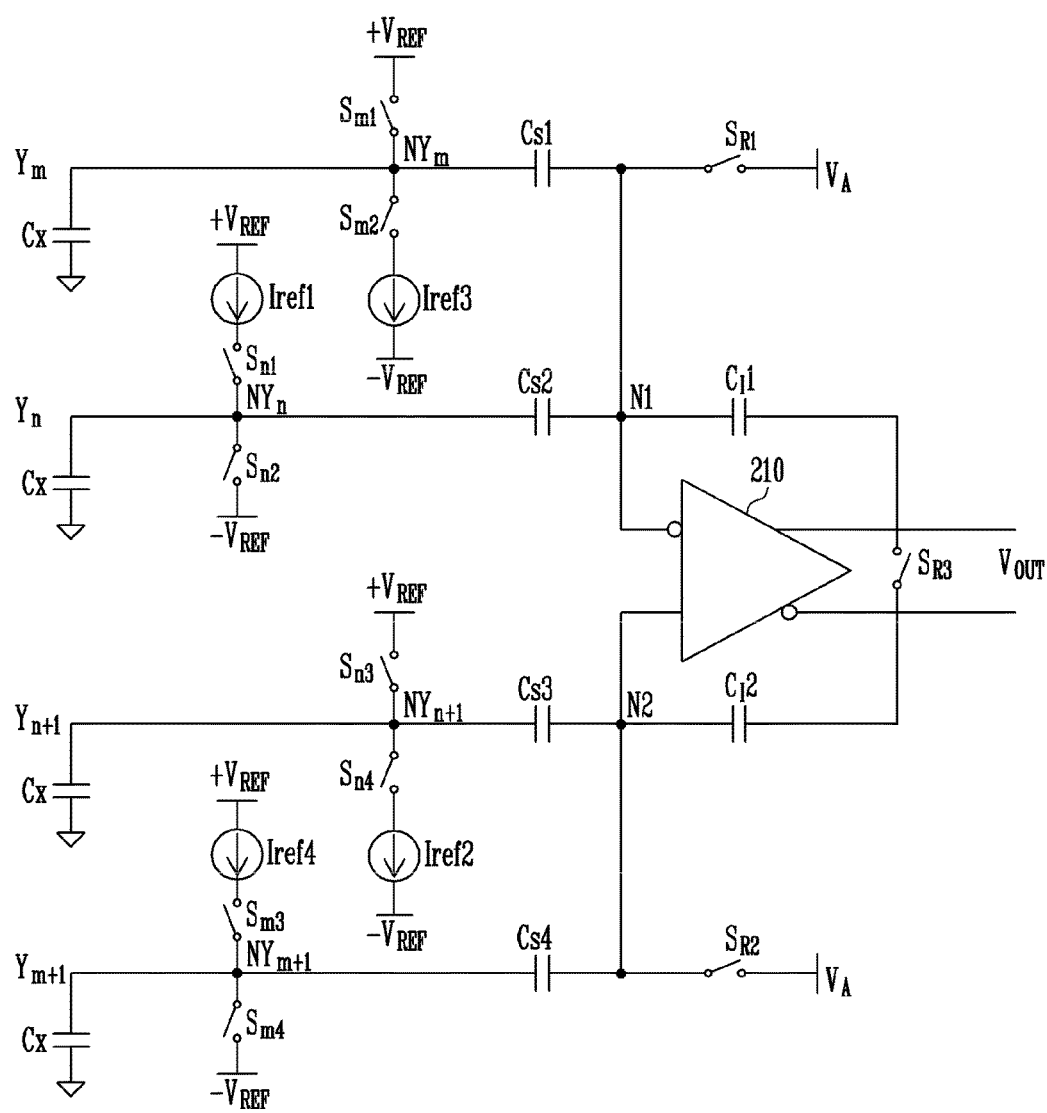
FIG. 2 is a diagram for describing a method of determining a touch input of the touch sensing device according to an exemplary embodiment of the present inventive concept.

FIG. 2 is a diagram for schematically illustrating a sensing circuit provided in the control unit according to an exemplary embodiment of the present inventive concept.

Hereinafter, the inventive concept is described based on an example, in which a sensing signal output from the plurality of first electrodes 130 is obtained, and exemplary embodiments to be described below may be equally applied to a case where a sensing signal output from the plurality of second electrodes 120 is obtained.

According to the inventive concept, it is possible to obtain a sensing signal according to a touch input using the sensing circuit illustrated in FIG. 2. The sensing circuit may be connected with four output channels, and simultaneously sense signals input from the four output channels.

The four output channels may be a first output channel Yn corresponding to a first sensing electrode, a second output channel Yn+1 corresponding to a second sensing electrode, a third output channel $Y_m$ corresponding to a third sensing electrode, and a fourth output channel $Y_{m+1}$ corresponding to a fourth sensing electrode. The first, second, third, and fourth output channels are not necessarily arranged in the manner shown in FIG. 2, which is intended to show the electrical connection. For example, first output channel $Y_n$ may be disposed adjacent to the second output channel $Y_{n+1}$, and the third output channel $Y_m$ may be disposed adjacent to the fourth output channel $Y_{m+1}$.

The first to fourth sensing electrodes may be a part of the first electrodes 130, or may also be a part of the second electrodes 120.

The first sensing electrode and the second sensing electrode may be adjacent electrodes, and the third sensing electrode and the fourth sensing electrode may also be adjacent electrodes. In this case, the first sensing electrode (or the second sensing electrode) and the third sensing electrode (or the fourth sensing electrode) may also be adjacent to each other. However, the inventive concept is not limited thereto, and these sensing electrodes may be spaced apart from each other at a predetermined interval.

For example, when the first sensing electrode is the first electrode disposed on the first line, the second sensing electrode may be the first electrode disposed on the second line. Further, when the third sensing electrode is the first electrode disposed on the 25th line, the fourth sensing electrode may be the first electrode disposed on the 26th line.

In this case, the sensing circuit may simultaneously sense the signals output from the first electrode disposed in the first line, the first electrode disposed in the second line, the first electrode disposed in the 25th line, and the first electrode disposed in the 26th line, and determine whether a touch input is applied to any one of the first electrode disposed in the first line, the first electrode disposed in the second line, the first electrode disposed in the 25th line, and the first electrode disposed in the 26th line by comparing the signals.

Referring to FIG. 2, the sensing circuit according to the inventive concept may include a power supply unit connected to each of the output channels $Y_n$, $Y_{n+1}$, $Y_m$, and $Y_{m+1}$, a plurality of first switches $S_{n1}$ to $S_{n4}$ and $S_{m1}$ to $S_{m4}$, a plurality of first capacitors Cs1 to Cs4, a plurality of second capacitors $C_f1$ and $C_f2$, and a plurality of second switches $S_{R1}$ to $S_{R3}$ for controlling a supply of power of the respective output channels Yn, $Y_{n+1}$, $Y_m$, and $Y_{m+1}$. Furthermore, there is a comparing unit 210.

As described above, the touch sensing device according to the inventive concept particularly adopts the self-capacitance scheme, so that it is possible to recognize a touch based on the difference between a value of a change in capacitance generated when the touch panel of the touch sensing device is touched and a value of capacitance of the touch panel itself before the touch. A plurality of self-capacitors Cx included in each output channel in FIG. 2 may correspond to capacitance in the touch sensing device itself before the touch.

The power supply unit may include first to fourth constant current sources Iref1 to Iref4, a first power supply, and a second power supply (not illustrated) connected to each output channel, and a voltage of the first supply may be $V_{REF}$ and a voltage of the second power supply may be $-V_{REF}$.

Particularly, the first power supply, the second power supply, and the first constant current source Iref1 provided between the first power supply and the second power supply may be connected to the first output channel Yn, and a predetermined voltage may be supplied to the first output channel Yn according to the control of the plurality of first switches $S_{n1}$ and $S_{n2}$ provided between the first constant current source Iref1 and the second power supply.

Similarly, the first power supply, the second power supply, and the second constant current source Iref2 provided between the first power supply and the second power supply may be connected to the second output channel $Y_{n+1}$, and a predetermined voltage may be supplied to the second output channel $Y_{n+1}$ according to the control of the plurality of first switches $S_{n3}$ and $S_{n4}$ provided between the first power supply and the second constant current source Iref2.

Operation polarities of the first constant current source Iref1 provided at the first output channel $Y_n$ and the second constant current source Iref2 provided at the second output channel $Y_{n+1}$ may be opposites.

The first power supply, the second power supply, and the third constant current source Iref3 provided between the first power supply and the second power supply may be connected to the third output channel $Y_m$. A predetermined voltage may be supplied to the third output channel $Y_m$ according to the control of the plurality of first switches $S_{m1}$ and $S_{m2}$ provided between the first power supply and the third constant current source Iref3.

Operation polarities of the first constant current source Iref1 provided at the first output channel $Y_n$ and the third constant current source Iref3 provided at the third output channel $Y_m$ may be opposites.

Last, the first power supply, the second power supply, and the fourth constant current source Iref4 provided between the first power supply and the second power supply may be connected to the fourth output channel $Y_{m+1}$, and a predetermined voltage may be supplied to the fourth output channel $Y_{m+1}$ according to the control of the plurality of first switches $S_{m3}$ and $S_{m4}$ provided between the fourth constant current source Iref4 and the second power supply.

Operation polarities of the fourth constant current source Iref4 provided at the fourth output channel $Y_{m+1}$ and the third constant current source Iref3 provided at the third output channel $Y_m$ may be opposites.

Changes in voltage of first to fourth nodes $NY_n$, $NY_{n+1}$, $NY_m$, and $NY_{m+1}$ according to the supply of power by the first power supply, the second power supply, and the first to fourth constant current sources Iref1 to Iref4 will be described in detail with reference to FIG. 3 below.

The comparing unit 210 may perform a function of comparing a voltage of the first node $NY_n$ connected to the first output channel with a voltage of the second node $NY_{n+1}$ connected to the second output channel. Particularly, the comparing unit 210 may perform a function, such as a function of a differential amplifier, to serve to remove noise commonly input into an input terminal of the comparing unit 210.

When a predetermined touch event is generated in the panel of the touch sensing device according to the inventive concept, common noise may be input into the electrodes corresponding to an area, in which the touch event is generated.

For example, where the electrodes corresponding to the area in which the touch event is generated is the first sensing electrode and the second sensing electrode is adjacent to the first sensing electrode, the common noise may be input into the first sensing electrode and the second sensing electrode.

According to the inventive concept, the two adjacent output lines are connected to the input terminal of the comparing unit 210, so that it is possible to remove the common noise applied to the touch panel of the touch sensing device.

Next, the input terminal of the comparing unit 210 may include a first input node N1 and a second input node N2. The comparing unit 210 may output a value that is proportional to a difference between a voltage V1 of the first input node N1 and a voltage V2 of the second input node N2. That is, an output voltage $V_{OUT}$ of the comparing unit 210 may have a value of a×(V2−V1) (where a is a real number equal to or larger than 1).

That is, the voltage V1 of the first input node N1 may be a voltage (hereinafter, referred to as "a first voltage") obtained by comparing a voltage of the first node $NY_n$ and a voltage of the third node $NY_m$, and the voltage of the second input node N2 may be a voltage (hereinafter, referred to as "a second voltage") obtained by comparing a voltage of the second node $NY_{n+1}$ and a voltage of the fourth node $NY_{m+1}$.

That is, the sensing circuit according to the inventive concept may compare the signals output from the first sensing electrode and the second sensing electrode adjacent to the first sensing electrode and signals output from the third sensing electrode and the fourth sensing electrode adjacent to the third sensing electrode, respectively, and compare the signals output from the first sensing electrode and the third sensing electrode and the signals output from the second sensing electrode and the fourth sensing electrode, respectively. The sensing circuit also analyzes a result of the comparison and determines whether a touch is received.

In in the present specification, for convenience of description, it is assumed that the comparing unit 210 is a calculation amplifier. However, the comparing unit 210 is not limited thereto, and if a circuit calculates and outputs a difference between input signals, the circuit may be considered as the comparing unit 210 according to the present invention. Accordingly, the comparing unit 210 may further include a resistor, a capacitor, a transistor, a calculation amplifier, and the like.

The sensing circuit may include a plurality of first capacitors Cs1 to Cs4 connected between the first to fourth nodes $NY_n$, $NY_{n+1}$, $NY_m$, and $NY_{m+1}$ and the input terminal of the comparing unit 210. The plurality of first capacitors Cs1 to Cs4 is provided, so that a first voltage value, which is a difference between the voltage of the first node $NY_n$ and the voltage of the third node $NY_m$, and a second voltage value, which is a difference between the voltage of the second node $NY_{n+1}$ and the voltage of the fourth node $NY_{m+1}$, may be input to the comparing unit 210 as an input signal.

A plurality of second capacitors $C_I1$ and $C_I2$ may be provided between the input terminal and the output terminal of the comparing unit 210. In this case, a size of the output voltage of the comparing unit 210 may be controlled according to a ratio (Cs/CI) of capacitance Cs of the first capacitors Cs1 to Cs4 to capacitance CI of the second capacitors $C_I1$ and $C_I2$, respectively.

A plurality of second switches $S_{R1}$ to $S_{R3}$ may be connected between the input terminal and the output terminal of the comparing unit 210, and the plurality of second switches $S_{R1}$ to $S_{R3}$ may serve to initialize a voltage of each of the input terminal and the output terminal of the comparing unit 210. When the second switches $S_{R1}$ to $S_{R3}$ are turned on, the input terminal and the output terminal of the comparing unit 210 may be initialized so as to correspond to a predetermined reference voltage VA.

In the meantime, a touch sensing method by using the comparing unit 210 will be described in detail with reference to FIGS. 3 to 7 below.

FIGS. 3 to 7 illustrate a touch input sensing method according to an exemplary embodiment, and are diagrams schematically illustrating waveforms of the voltages $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ and the output voltage $V_{OUT}$.

Figure 3:
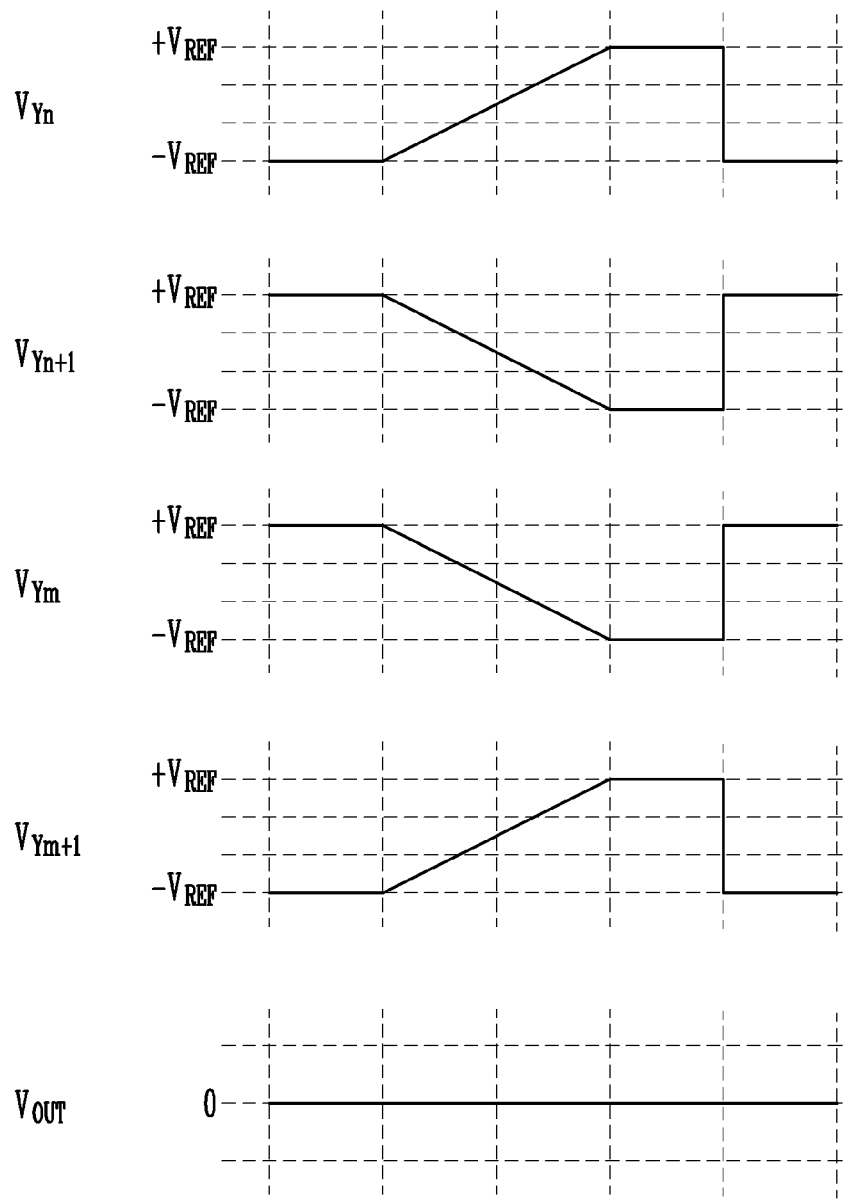
FIG. 3 is a diagram schematically illustrating waveforms of first to fourth nodes and an output voltage illustrated in FIG. 2 in the absence of touch input.

First, FIG. 3 is a diagram schematically illustrating waveforms of the voltages $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ and the output voltage $V_{OUT}$ in the absence of touch input.

The voltage $V_{Yn}$ of the first node $NY_n$ may be represented as illustrated in FIG. 3 while the sensing circuit senses the signal output from the first sensing electrode. That is, predetermined power (the first constant current source Iref1, the first power, and the second power) may be supplied so that the voltage $V_{Yn}$ of the first node $NY_n$ is increased from the voltage $-V_{REF}$ of the second power and saturated at the voltage $V_{REF}$ of the first power.

The voltage $V_{Yn+1}$ of the second node $N_{Yn+1}$ may be represented as illustrated FIG. 3 while the sensing circuit senses the signal output from the second sensing electrode. That is, a predetermined amount of power (the second constant current source Iref2, the first power, and the second power) may be supplied so that the voltage $V_{Yn+1}$ of the second node $NY_{n+1}$ is dropped from the voltage $V_{REF}$ of the first power and saturated at the voltage $-V_{REF}$ of the second power.

Operation polarities of the first constant current source Iref1 provided at the first output channel Yn and the second constant current source Iref2 provided at the second output channel Yn+1 are opposites, so that polarities of a voltage waveform of the first node $V_{Yn}$ and a voltage waveform of the second node $V_{Yn+1}$ may be opposite s as illustrated in FIG. 3.

The voltage $V_{Ym}$ of the third node $NY_m$ may be represented as illustrated FIG. 3 while the sensing circuit senses the signal output from the third sensing electrode. That is, a predetermined amount of power (third second constant current source Iref3, the first power, and the second power) may be supplied so that the voltage $V_{Ym}$ of the third node $NY_m$ is dropped from the voltage $V_{REF}$ of the first power and saturated at the voltage $-V_{REF}$ of the second power.

The voltage $V_{Ym+1}$ of the fourth node $NY_{m+1}$ may be represented as illustrated FIG. 3 while the sensing circuit senses the signal output from the fourth sensing electrode. That is, a predetermined amount of power (the fourth constant current source Iref4, the first power, and the second power) may be supplied so that the voltage $V_{Ym+1}$ of the fourth node $NY_{m+1}$ is increased from the voltage $-V_{REF}$ of the second power and saturated at the voltage $V_{REF}$ of the first power.

Operation polarities of the third constant current source Iref3 provided at the third output channel Ym and the fourth constant current source Iref4 provided at the fourth output channel Ym+1 are opposites, so that polarities of a voltage waveform of the third node $V_{Ym}$ and a voltage waveform of the fourth node $V_{Ym}+1$ may be opposites as illustrated in FIG. 3.

The first switches corresponding to reference numerals $S_{n2}$, $S_{n3}$, $S_{m1}$, and $S_{m4}$ among the plurality of first switches may be operated by the same control signal, and the remaining first switches $S_{n1}$, $S_{n4}$, $S_{m2}$, and $S_{m3}$ may be operated by the same control signal.

When a touch input is not applied to any of the first to fourth sensing electrodes, the voltages of $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ do not change according to a difference in the capacitance value generated during the input of the touch. Hence, in the absence of a touch input, the output voltage $V_{OUT}$ of the comparing unit 210 may be represented as illustrated in FIG. 3.

A size of the first voltage V1, which is the difference between the voltage $V_{Yn}$ of the first node $NY_n$ and the voltage $V_{Ym}$ of the third node $NY_m$, is the same as a size of the second voltage V2, which is the difference between the voltage $V_{Yn+1}$ of the second node $NY_{n+1}$ and the voltage $V_{Ym+1}$ of the fourth node $NY_{m+1}$. This way, the output voltage $V_{OUT}$ of the comparing unit 210 is 0.

According to the exemplary embodiment, when the output voltage $V_{OUT}$ of the comparing unit 210 is 0, it is determined that the touch input is not generated in the first to fourth sensing electrodes.

Figure 4:
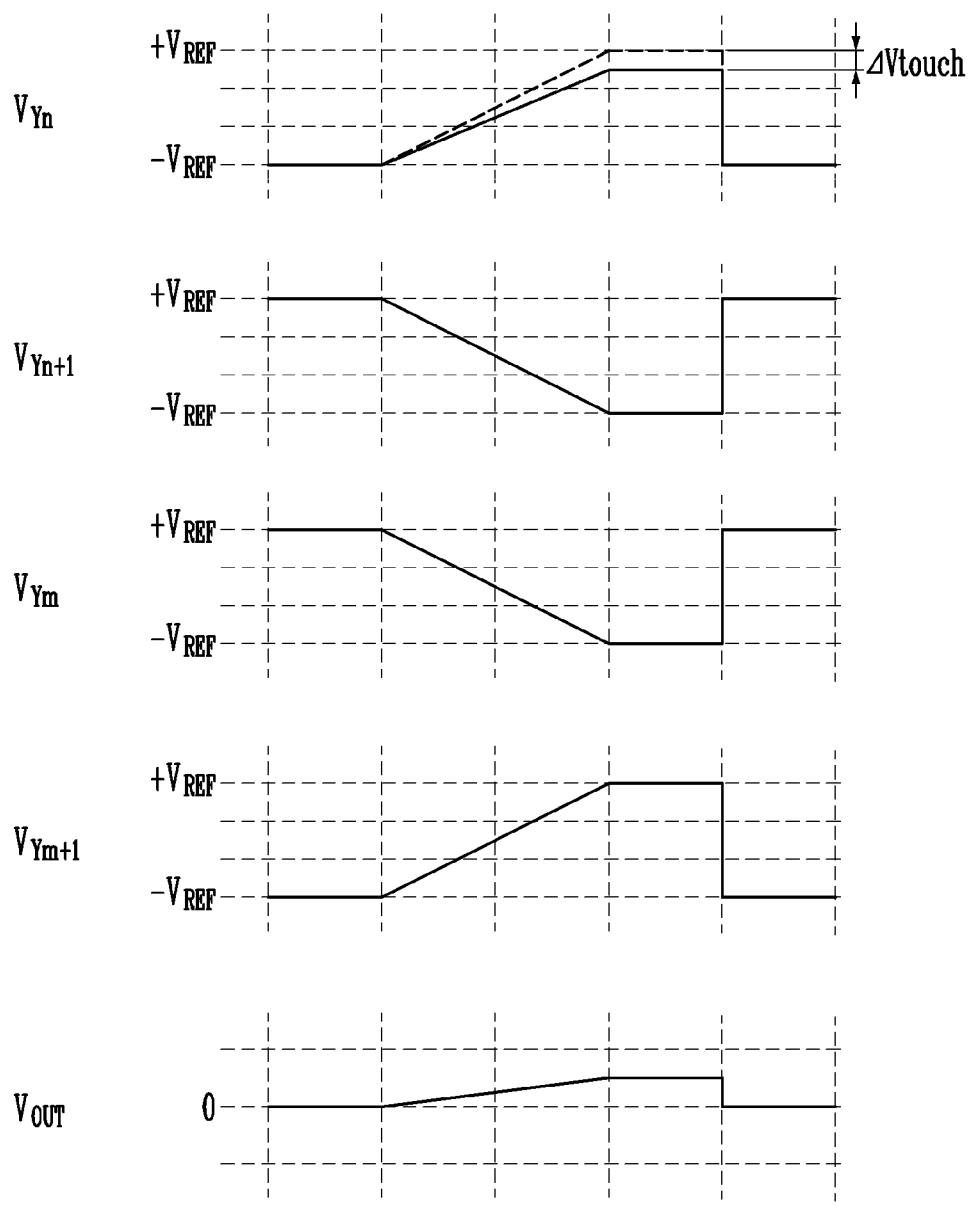
FIG. 4 is a diagram schematically illustrating waveforms of first to fourth nodes and an output voltage when a touch input is applied to a first sensing electrode illustrated in FIG. 2.

FIG. 4 is a diagram schematically illustrating waveforms of the voltages $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ and the output voltage $V_{OUT}$ when a touch input is applied to the first sensing electrode.

Referring to FIG. 4, the voltage $V_{Yn}$ of the first node $NY_n$ may be changed by a difference in capacitance value according to a touch input, and $\Delta$Vtouch may be a voltage value corresponding to a capacitance value according to a touch input (the waveform illustrated by a broken line corresponds to a waveform representing the voltage $V_{Yn}$ of the first node $NY_n$ in the absence of a touch input).

The voltages $V_{Yn+1}$, $V_{Ym}$, and $V_{Ym+1}$ of the nodes, that is, the second to fourth nodes $NY_{n+1}$, $NY_m$, and $NY_{m+1}$, corresponding to the remaining sensing electrodes, to which a touch input is not applied, may result in the same waveforms as that illustrated in FIG. 3.

Accordingly, the first voltage V1, which is the difference between the voltage $V_{Yn}$ of the first node $NY_n$ and the voltage $V_{Ym}$ of the third node $NY_m$, and the second voltage V2, which is the difference between the voltage $V_{Yn+1}$ of the second node $NY_{n+1}$ and the voltage $V_{Ym+1}$ of the fourth node $NY_{m+1}$, represent a difference by $\Delta$Vtouch. In this case, the output voltage $V_{OUT}$ of the comparing unit 210 may be expressed by Equation 1 below.

$$V_{OUT} = C_s/C_f \times \Delta V\text{touch.} \quad [\text{Equation 1}]$$

As illustrated in FIG. 4, when the output voltage $V_{OUT}$ has a predetermined value that is not 0, it may be determined that a touch input is generated.

Figure 5:
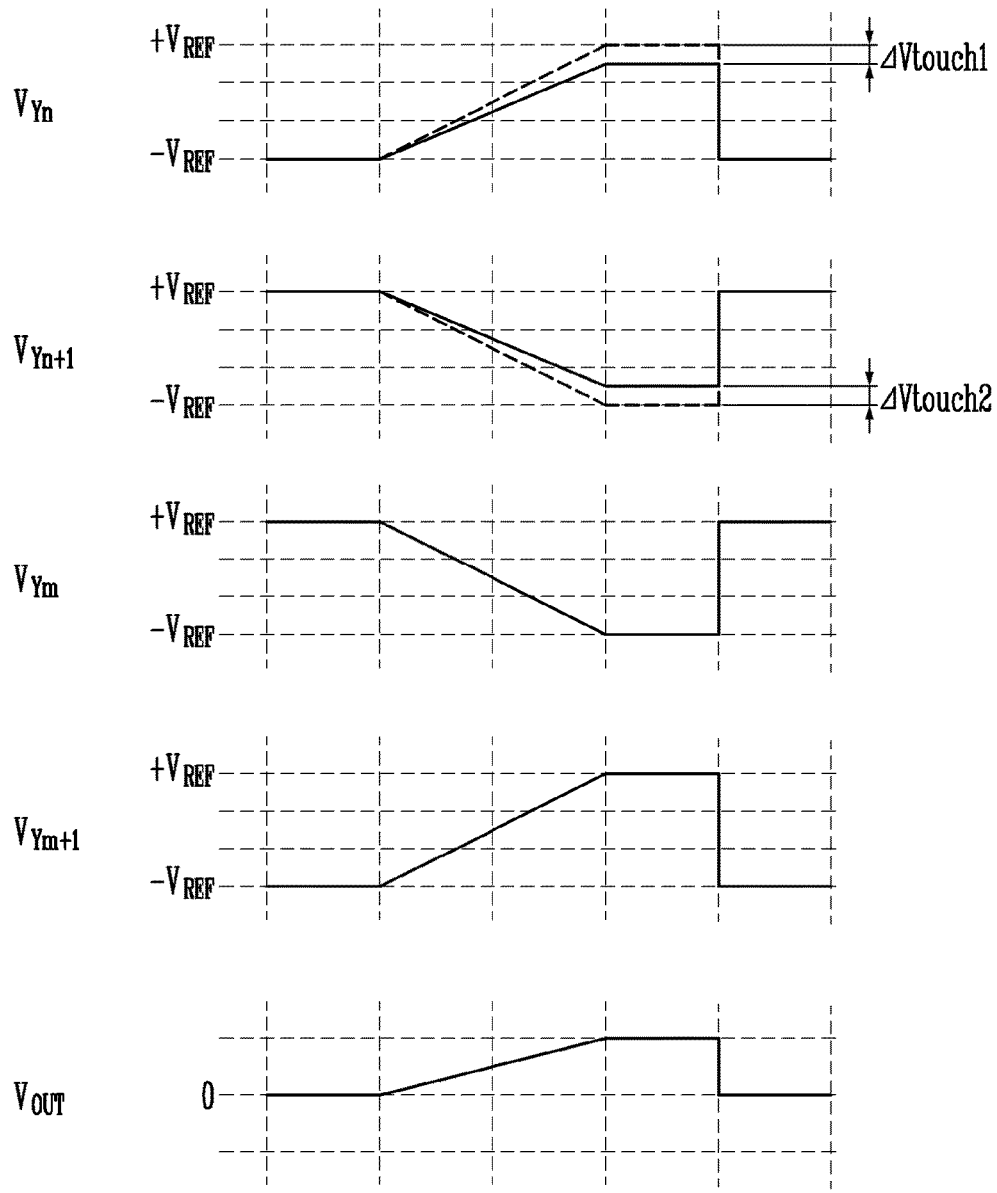
FIG. 5 is a diagram schematically illustrating waveforms of first to fourth nodes and an output voltage when a touch input is simultaneously applied to first and second sensing electrodes illustrated in FIG. 2.

FIG. 5 is a diagram schematically illustrating waveforms of the voltages $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ and the output voltage $V_{OUT}$ when a touch input is simultaneously applied to the first and second sensing electrodes.

Referring to FIG. 5, the voltage $V_{Yn}$ of the first node $NY_n$ may be changed by a difference in a capacitance value according to a touch input, and $\Delta$Vtouch1 may be a value representing a size of a voltage corresponding to a capacitance value according to a touch input (a waveform illustrated by a broken line corresponds to a waveform representing the voltage $V_{Yn}$ of the first node $NY_n$ when a touch input is not generated).

Further, a touch input is also generated in the second sensing electrode, so that the voltage $V_{Yn+1}$ of the second node $NY_{n+1}$ may also be changed, and $\Delta$Vtouch2 may be a value representing a size of a voltage corresponding to a capacitance value according to a touch input.

The voltages of the nodes corresponding to the remaining sensing electrodes to which a touch input is not applied— that is, the voltage $V_{Ym}$ of the third node $NY_m$ and the voltage $V_{Ym+1}$ of the fourth node $NY_{m+1}$—may result in the same waveforms as that illustrated in FIG. 3.

Accordingly, the first voltage V1, which is the difference between the voltage $V_{Yn}$ of the first node $NY_n$ and the voltage $V_{Ym}$ of the third node $NY_m$, and the second voltage V2, which is the difference between the voltage $V_{Yn+1}$ of the second node $NY_{n+1}$ and the voltage $V_{Ym+1}$ of the fourth node $NY_{m+1}$, may be represented as $\Delta$Vtouch1 and $\Delta$Vtouch2, respectively, so that the difference between the first voltage V1 and the second voltage V2 is $\Delta$Vtouch1+$\Delta$Vtouch2, and thus the output voltage $V_{OUT}$ of the comparing unit 210 may be expressed by Equation 2 below.

$$V_{OUT}=Cs/C_f \times (\Delta V\text{touch}+\Delta V\text{touch2}) \quad \text{[Equation 2]}$$

As illustrated in FIG. 5, when the output voltage $V_{OUT}$ has a predetermined value that is not 0, it may be determined that a touch input is generated. Comparing FIGS. 4 and 5, a case where a touch input is applied to two adjacent sensing electrodes may result in a larger output voltage $V_{OUT}$ of the comparing unit 210 than that of a case where a touch input is applied to one sensing electrode.

Figure 6:
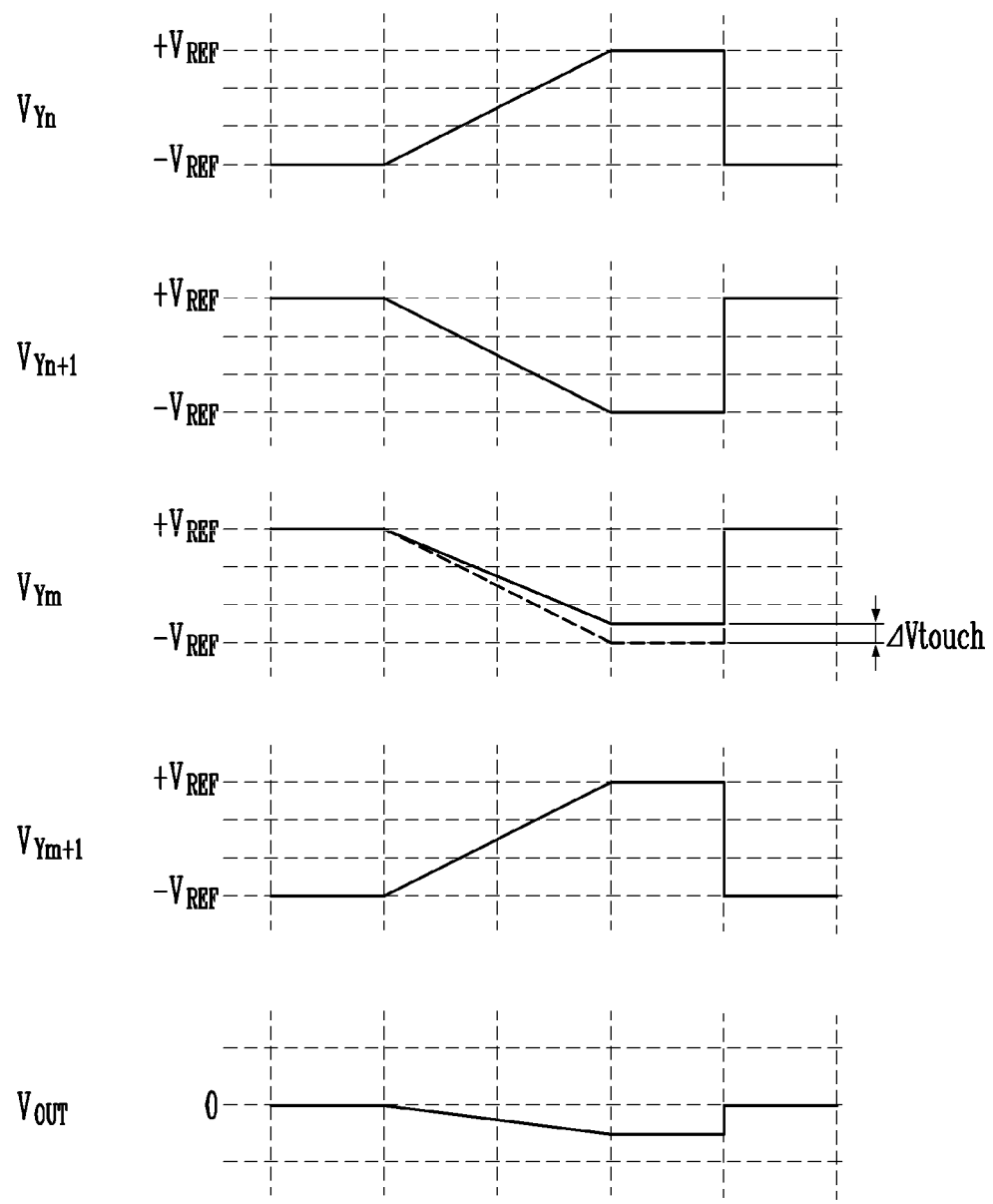
FIG. 6 is a diagram schematically illustrating waveforms of first to fourth nodes and an output voltage when a touch input is applied to a third sensing electrode illustrated in FIG. 2.

FIG. 6 is a diagram schematically illustrating waveforms of the voltages $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ and the output voltage $V_{OUT}$ when a touch input is applied to the third sensing electrode.

Referring to FIG. 6, the voltage $V_{Ym}$ of the third node $NY_m$ may be changed by a difference in a capacitance value according to a touch input, and $\Delta V$touch may be a value representing a size of a voltage corresponding to a capacitance value according to a touch input (the waveform illustrated by a broken line corresponds to a waveform representing the voltage $V_{Ym}$ of the third node $NY_m$ when a touch input is not generated).

The voltages $V_{Yn}$, $V_{Yn+1}$, and $V_{Ym+1}$ of the nodes $NY_n$, $NY_{n+1}$, $NY_{m+1}$ corresponding to the remaining sensing electrodes, to which no touch input is applied, may represent the same waveform as in FIG. 3.

Accordingly, the first voltage V1, which is the difference between the voltage $V_{Yn}$ of the first node $NY_n$ and the voltage $V_{Ym}$ of the third node $NY_m$, and the second voltage V2, which is the difference between the voltage $V_{Yn+1}$ of the second node $NY_{n+1}$ and the voltage $V_{Ym+1}$ of the fourth node $NY_{m+1}$, represent a difference by $\Delta V$touch so that a waveform of the output voltage illustrated in FIG. 6 may result. In this case, the output voltage $V_{OUT}$ may be output with a polarity that is opposite of what it would be when a touch input is applied to the first sensing electrode.

Figure 7:
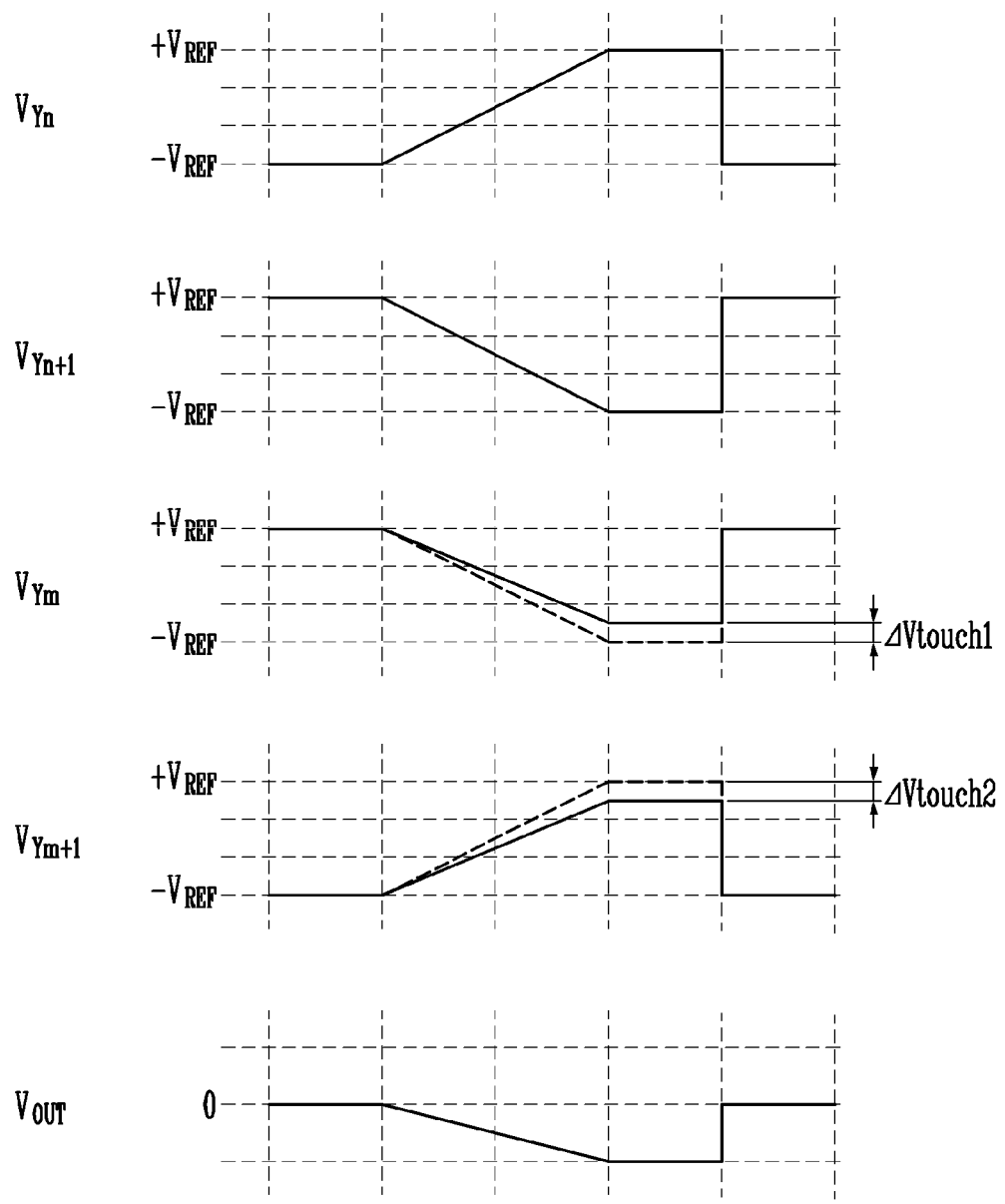
FIG. 7 is a diagram schematically illustrating waveforms of first to fourth nodes and an output voltage when a touch input is simultaneously applied to third and fourth sensing electrodes illustrated in FIG. 2.

FIG. 7 is a diagram schematically illustrating waveforms of the voltages $V_{Yn}$, $V_{Yn+1}$, $V_{Ym}$, and $V_{Ym+1}$ of the first to fourth nodes $NY_n$, $NY_{n+1}$, $NY_m$, and $NY_{m+1}$ and the output voltage $V_{OUT}$ when a touch input is simultaneously applied to the third and fourth sensing electrodes.

Referring to FIG. 7, the voltage $V_{Ym}$ of the third node $NY_m$ may be changed by a difference in a capacitance value according to a touch input, and $\Delta V$touch1 may be a value representing a size of a voltage corresponding to a capacitance value according to a touch input (the waveform illustrated by a broken line corresponds to a waveform representing the voltage $V_{Ym}$ of the third node $NY_m$ when a touch input is not generated).

Further, a touch input is generated in the fourth sensing electrode, so that the voltage $V_{Yn+1}$ of the fourth node $NY_{m+1}$ may also be changed, and $\Delta V$touch2 may be a value representing a size of a voltage corresponding to a capacitance value according to a touch input.

The voltages of the nodes corresponding to the remaining sensing electrodes to which a touch input is not applied, that is, the voltage $V_{Yn}$ of the first node $NY_n$ and the voltage $V_{Yn+1}$ of the second node $NY_{n+1}$, may look the same as in FIG. 3.

Accordingly, the first voltage V1, which is the difference between the voltage $V_{Yn}$ of the first node $NY_n$ and the voltage $V_{Ym}$ of the third node $NY_m$, and the second voltage V2, which is the difference between the voltage $V_{Yn+1}$ of the second node $NY_{n+1}$ and the voltage $V_{Ym+1}$ of the fourth node $NY_{m+1}$, may be represented as $-\Delta V$touch1 and $\Delta V$touch2, respectively. The difference between the first voltage V1 and the second voltage V2 is $-(\Delta V\text{touch1}+\Delta V\text{touch2})$, resulting in a waveform of the output voltage illustrated in FIG. 7.

In this case, the output voltage may be output with a polarity that is opposite of the output voltage $V_{OUT}$ that would result if a touch input is applied to the first and second sensing electrodes.

Referring to FIGS. 3 to 7, when the output voltage $V_{OUT}$ of the comparing unit 210 is 0, it may be determined that a touch input is not generated in the first to fourth sensing electrodes, and when the output voltage $V_{OUT}$ has a predetermined value that other than 0, it may be determined that a touch input is generated.

Further, a case where a touch input is applied to all of the two adjacent sensing electrodes has a larger output voltage $V_{OUT}$ of the comparing unit 210 than where a touch input is applied to one sensing electrode. Hence, a determination of whether the touch input is applied to all of the two adjacent sensing electrodes or one sensing electrode may be made based on the size of the output voltage.

Further, when a touch input is applied to the first sensing electrode and the second sensing electrode, a positive output voltage $V_{OUT}$ is output. When a touch input is applied to the third sensing electrode and the fourth sensing electrode, a negative output voltage $V_{OUT}$ is output. Hence, a determination of whether the touch input is applied to the first and/or second sensing electrodes or the third and/or fourth sensing electrodes may be made based on the polarity of the output voltage $V_{OUT}$.

As described above, the touch sensing device according to the present disclosure adopts the self-capacitance scheme, so that the touch sensing device may recognize whether a touch is input by a difference between a change value of capacitance (hereinafter, a capacitance variation by a touch) generated when the touch panel of the touch sensing device is touched and a capacitance value of the touch panel itself (hereinafter, self capacitance) before the touch.

In this case, the self-capacitance is considerably larger than a variation of capacitance by the touch. Thus, to improve accuracy in the determination of whether a touch is input, it is important to accurately obtain a variation of capacitance by a touch having a micro size compared to the self-capacitance.

According to the present disclosure, it is possible to compare the voltages in which an effect by the self-capacitance included in all of the output channels is removed. This is achieved by inputting the first voltage V1, which is the difference between the voltage $V_{Yn}$ of the first node $NY_n$ and the voltage $V_{Ym}$ of the third node $NY_m$, and the second voltage V2, which is the difference between the voltage $V_{Yn}+1$ of the second node $NY_{n+1}$ and the voltage $V_{Ym+1}$ of the fourth node $NY_{m+1}$, into the comparing unit 210.

This way, it is possible to remove the effect of noise by the self-capacitance by inputting the first voltage V1, which is the difference between the voltage $V_{Yn}$ of the first node $NY_n$ and the voltage $V_{Ym}$ of the third node $NY_m$ (or the second voltage V2, which is the difference between the voltage $V_{Yn}+1$ of the second node $NY_{n+1}$ and the voltage $V_{Ym+1}$ of the fourth node $NY_{m+1}$) into the comparing unit 210. It is also possible to remove the effect of the common noise input into the panel according to the touch input by inputting the first output channel and the second output channel adjacent to the first output channel into the different input units of the comparing unit 210, respectively.

Further, according to the exemplary embodiment of the inventive concept, an SNR is improved so that even when a variation of capacitance according to a touch input (such as with a hovering input) is very small, it is possible to accurately determine whether a touch is input.

In FIGS. 2 to 7, the inventive concept is described with an assumption that one amplifier serving as the comparing unit is provided in the sensing circuit. However, this is just an example embodiment and not a limitation of the inventive concept.

It is possible to amplify a value of a voltage variation according to a touch input by further providing an amplifier at the output terminal of the comparing unit illustrated in FIG. 2.

Figure 15:
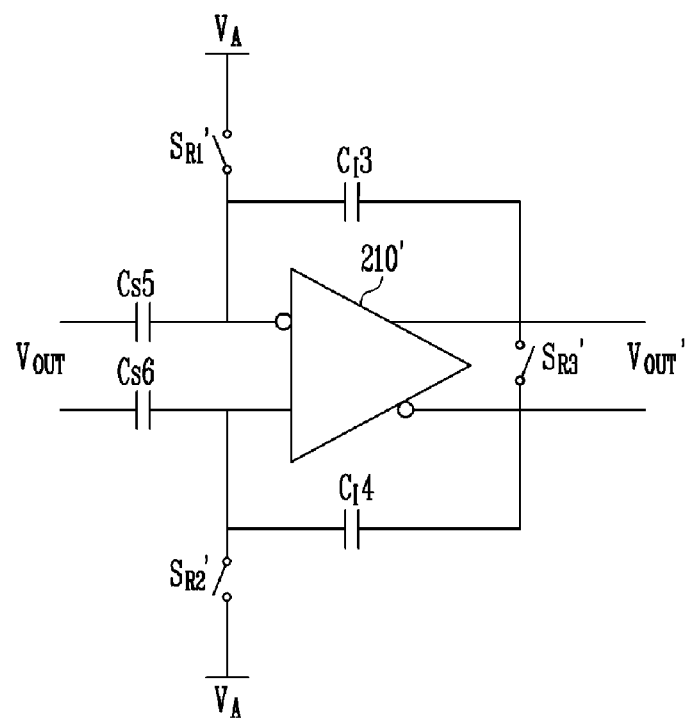
FIG. 15 is a diagram for describing an amplifier, which is connectable to an output terminal of a comparing unit illustrated in FIG. 2 according to another exemplary embodiment of the present invention.

FIG. 15 is a diagram for describing an amplifier, which is connectable to the output terminal of the comparing unit 210 according to another exemplary embodiment.

Referring to FIG. 15, an amplifier 210' may be further provided at the output terminal of the comparing unit 210 illustrated in FIG. 2. Similarly to the comparing unit 210, a plurality of first capacitors Cs5 and Cs6 may be connected to both input terminals of the amplifier 210', and a plurality of switches $S_{R1}'$ to $S_{R3}'$ may be connected to both input terminals and an output terminal, respectively. The plurality of second switches $S_{R1}'$ to $S_{R3}'$ may serve to initialize a voltage of each of the input terminals and the output terminal of the amplifier 210'. When the plurality of second switches $S_{R1}'$ to $S_{R3}'$ are turned on, the input terminals and the output terminal of the amplifier 210' may be initialized so as to correspond to a predetermined reference voltage VA.

Further, similar to the comparing unit 210, a plurality of second capacitors $C_f3$ and $C_f4$ may be provided between the input terminals and the output terminal of the amplifier 210'. In this case, a size of an output voltage $V_{OUT}'$ of the amplifier 210' may be controlled according to a ratio of capacitance of the first capacitors Cs5 and Cs6 and capacitance of the second capacitors $C_f3$ and $C_f4$.

Hereinafter, a method of determining coordinates of a touch input according to the present disclosure will be described in detail with reference to FIG. 8 together with FIGS. 1 to 7.

Figure 8:
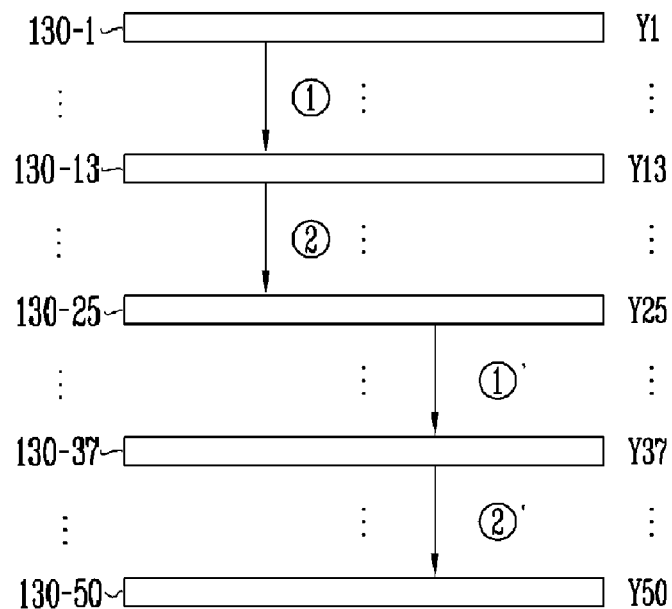
FIGS. 8, 9, 10, 11, 12, 13, and 14 are diagrams for describing a method for determining a position of a touch input according to the present invention.

FIG. 8 is a diagram for describing a method for determining a position of a touch input according to the present invention. Here, descriptions that were already provided for the aforementioned exemplary embodiment are omitted to avoid redundancy, and descipritons will focus on different parts than those of the aforementioned exemplary embodiment.

Particularly, FIG. 8 schematically illustrates the first electrode 130 extending in the horizontal direction illustrated in FIG. 1, and signals output from the first electrodes 130-1 to 130-50 may be input to channels Y1 to Y50 corresponding to the first electrodes 130-1 to 130-50, respectively.

In the present specification, for convenience, the inventive concept is described with an assumption that 50 first electrodes 130-1 to 130-50 are provided.

First, according to the exemplary embodiment, the first electrodes 130-1 to 130-50 may be divided into four groups, that is, a first group, a second group, a third group, and a fourth group, and each two groups may be sensed. For example, the first electrodes included in the first group and the second group may be first sensed, and the first electrodes included in the third group and the fourth group may be sensed after the sensing of the first group.

For example, the first group may include the first electrodes 130-1 to 130-13 corresponding to reference numeral ①of FIG. 8, the first electrodes 130-1 to 130-13 may correspond to the first sensing electrodes and the second sensing electrodes. The second group may include the first electrodes 130-25 to 130-37 corresponding to reference numeral ①' of FIG. 8, the first electrodes 130-25 to 130-37 may correspond to the third sensing electrodes and the fourth sensing electrodes.

Table 1 below represents the first to fourth output channels connected to the sensing circuit according to the inventive concept in a sensing order.

TABLE 1

| Sensing order | First output channel (Yn) | Fourth output channel (Ym + 1) | Third output channel (Ym) | Second output channel (Yn + 1) |
|---|---|---|---|---|
| 1 | Y1 | Y26 | Y25 | Y2 |
| 2 | Y2 | Y27 | Y26 | Y3 |
| ... | ... | ... | ... | ... |
| 11 | Y11 | Y36 | Y35 | Y12 |
| 12 | Y12 | Y37 | Y36 | Y13 |

As represented in Table 1, Y1, Y2, Y25, and Y26 may be connected as the first to fourth output channels during the first sensing, Y2, Y3, Y26, and Y27 may be connected as the first to fourth output channels during the second sensing, . . . , and Y12, Y13, Y36, and Y37 may be connected as the first to fourth output channels during the 12th sensing.

When the sensing of the first group and the second group is terminated, the sensing of the third group and the fourth group may be started.

For example, the third group may include the first electrodes 130-13 to 130-25 corresponding to reference numeral ② of FIG. 8, the first electrodes 130-13 to 130-25 may correspond to the first sensing electrodes and the second sensing electrodes. The fourth group may include the first electrodes 130-37 to 130-50 corresponding to reference numeral ②' of FIG. 8, the first electrodes 130-37 to 130-50 may correspond to the third sensing electrodes and the fourth sensing electrodes.

Table 2 below represents the first to fourth output channels included in the third and fourth groups connected to the sensing circuit according to the inventive concept in a sensing order.

TABLE 2

| Sensing order | First output channel (Yn) | Fourth output channel (Ym + 1) | Third output channel (Ym) | Second output channel (Yn + 1) |
|---|---|---|---|---|
| 1 | Y13 | Y38 | Y37 | Y14 |
| 2 | Y14 | Y39 | Y38 | Y15 |
| ... | ... | ... | ... | ... |
| 11 | Y23 | Y49 | Y48 | Y24 |
| 12 | Y24 | Y50 | Y49 | Y25 |

As represented in Table 2, Y13, Y14, Y37, and Y38 may be connected as the first to fourth output channels during the first sensing, Y14, Y15, Y38, and Y39 may be connected as the first to fourth output channels during the second sensing, . . . , and Y24, Y25, Y49, and Y50 may be connected as the first to fourth output channels during the 12$^{th}$ sensing.

That is, the first electrodes may be sequentially sensed according to the order represented in Table 1, and then, the remaining first electrodes may be sequentially sensed according to the order represented in Table 2.

Hereinafter, the method of sensing a touch input by the sensing circuit, and the method of determining whether a touch is input and coordinates of the touch input by combining the sensing orders of the first electrodes will be described, and will be described based on a case where a touch input is applied to the 14$^{th}$ first electrode 130-14 and the 15$^{th}$ first electrode 130-15 as an example.

The 14$^{th}$ first electrode 130-14 and the 15$^{th}$ first electrode 130-15 are not included in the first group and the second group, so that when the first group and the second group are sensed, the output voltage V$_{OUT}$ of the comparing unit 210 may always be 0.

Next, when the sensing of the third group and the fourth group is started, Y13, Y14, Y37, and Y38 may be connected to the sensing circuit as the first to fourth output channels during the first sensing. In this case, the second output channel Y14 corresponds to the 14$^{th}$ first electrode 130-14, so that the output voltage V$_{OUT}$ of the comparing unit 210 may have a predetermined value according to a difference in a capacitance value according to a touch input.

Next, Y14, Y15, Y38, and Y39 may be connected to the sensing circuit during the second sensing. In this case, the first output channel Y14 corresponds to the 14$^{th}$ first electrode 130-14, and the second output channel Y15 corresponds to the 15$^{th}$ first electrode 130-15, so that the output voltage V$_{OUT}$ of the comparing unit 210 may have a predetermined value according to a difference in a capacitance value according to a touch input.

In the meantime, before this case, as described above with reference to FIGS. 4 and 5, the touch input is simultaneously generated in the two adjacent sensing electrodes, so that a size of the output voltage V$_{OUT}$ may be larger than a size of the output voltage V$_{OUT}$ during the first sensing or a size of the output voltage V$_{OUT}$ during the third sensing to be described below.

Next, Y15, Y16, Y39, nd Y40 may be connected to the sensing circuit during the third sensing. In this case, the first output channel Y15 corresponds to the 15$^{th}$ first electrode 130-15, so that the output voltage V$_{OUT}$ of the comparing unit 210 may have a predetermined value reflecting a difference in a capacitance value according to a touch input.

Further, from the fourth sensing, there is no output channel corresponding to the 14$^{th}$ first electrode 130-14 and the 15$^{th}$ first electrode 130-15 in the first to fourth output channels, so that the output voltage V$_{OUT}$ may be 0.

That is, the output voltage V$_{OUT}$ may have a predetermined value only at the first to third sensing orders, which are the sensing orders in which the output channels corresponding to the 14$^{th}$ first electrode 130-14 and the 15$^{th}$ first electrode 130-15 are included in the first to fourth output channels.

Accordingly, according to the inventive concept, it is possible to obtain the position at which the touch input is generated, that is, a Y coordinate of the touch input by analyzing a number of the output channel commonly included in the sensing order having the predetermined value and a polarity of the output voltage V$_{OUT}$ among the output voltages V$_{OUT}$ when all of 50 first electrodes 130-1 to 130-50 are sensed according to an exemplary embodiment.

Further, when the output voltage has the predetermined value at the three sensing orders as described in the example, it may be determined that the touch input is generated in all of the two first electrodes corresponding to the two commonly included output channels.

In the meantime, in the above, the method of obtaining the coordinates of the touch input based on the first electrode 130 as the example has been described, and it is possible to obtain an X-coordinate of the touch input by applying the same method to the second electrodes 120, in which the unit electrodes are extended in the vertical direction.

FIGS. 9 to 14 are diagrams for describing a method for determining a position of a touch input according to another exemplary embodiment of the inventive concept.

Figure 9:
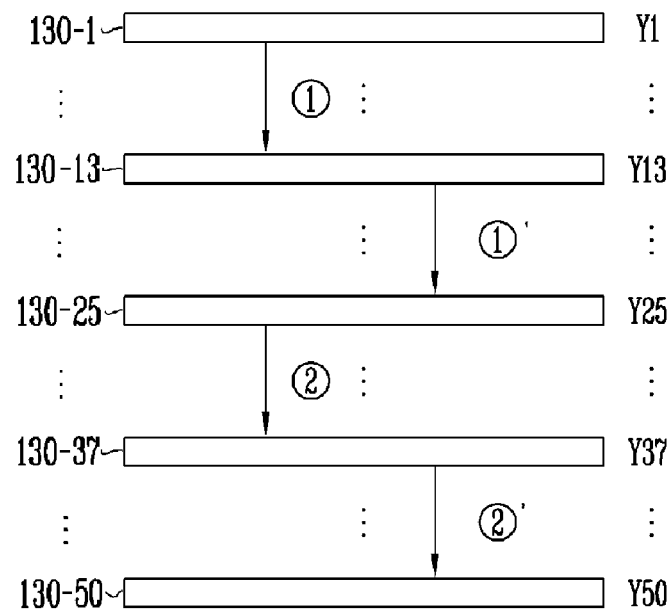

Referring to FIG. 9, the first electrodes 130-1 to 130-50 may be divided into four groups, that is, a first group, a second group, a third group, and a fourth group, and the groups may be sensed in pairs.

In this case, the first group may include the first electrodes 130-1 to 130-13 corresponding to reference numeral ① of FIG. 9, the first electrodes 130-1 to 130-13 may correspond to the first sensing electrodes and the second sensing electrodes. The second group may include the first electrodes 130-13 to 130-25 corresponding to reference numeral ①' of FIG. 9, the first electrodes 130-25 to 130-37 may correspond to the third sensing electrodes and the fourth sensing electrodes.

Further, the third group may include the first electrodes 130-25 to 130-37 corresponding to reference numeral ② of FIG. 9, the first electrodes 130-25 to 130-37 may correspond to the first sensing electrodes and the second sensing electrodes. The fourth group may include the first electrodes 130-37 to 130-50 corresponding to reference numeral ②' of FIG. 9, the first electrodes 130-37 to 130-50 may correspond to the third sensing electrodes and the fourth sensing electrodes.

Table 3 below represents the first to fourth output channels connected to the sensing circuit according to the inventive concept in a sensing order.

The first electrodes included in the first group and the second group may be first sensed, and then the first electrodes included in the third group and the fourth group may be sensed, and sensing orders 1 to 12 of Table 3 may be the sensing orders for the first group and the second group, and sensing orders 13 to 24 may be the sensing orders for the third group and the fourth group.

TABLE 3

| Sensing order | First output channel (Yn) | Fourth output channel (Ym + 1) | Third output channel (Ym) | Second output cannel (Yn + 1) |
|---|---|---|---|---|
| 1 | Y1 | Y14 | Y13 | Y2 |
| 2 | Y2 | Y15 | Y14 | Y3 |
| 3 | Y3 | Y16 | Y15 | Y4 |
| ... | ... | ... | ... | ... |
| 11 | Y11 | Y24 | Y23 | Y12 |
| 12 | Y12 | Y25 | Y24 | Y13 |
| 13 | Y25 | Y38 | Y37 | Y26 |
| 14 | Y26 | Y39 | Y38 | Y27 |
| ... | ... | ... | ... | ... |
| 23 | Y35 | Y49 | Y48 | Y36 |
| 24 | Y36 | Y50 | Y49 | Y37 |

In a case where a touch input is applied to the 14$^{th}$ first electrode 130-14 and the 15$^{th}$ first electrode 130-15, the output channels corresponding to the 14$^{th}$ first electrode 130-14 and the 15$^{th}$ first electrode 130-15 are sensed at the first to third sensing orders, so that the output voltage V$_{OUT}$ of the comparing unit 210 may have a predetermined value during the first to third sensing, the output voltage V$_{OUT}$ of the comparing unit 210 may be 0 from the fourth sensing.

In the meantime, according to the exemplary embodiment of FIG. 9, the output channels corresponding to the 14$^{th}$ first electrode 130-14 and the 15$^{th}$ first electrode 130-15 correspond to the third and fourth output channels, so that the polarity of the output voltage V$_{OUT}$ of the 14$^{th}$ first electrode 130-14 and the 15$^{th}$ first electrode 130-15 corresponding to the third and fourth output channels may be opposites of what they are in the exemplary embodiment of FIG. 8 (the output channels of the 14$^{th}$ first electrode 130-14 and the 15$^{th}$ first electrode 130-15 correspond to the first and second output channels).

In addition to the sensing order according to the exemplary embodiment illustrated in FIGS. 8 and 9, the sensing order of the first electrode may be changed.

Figure 10:
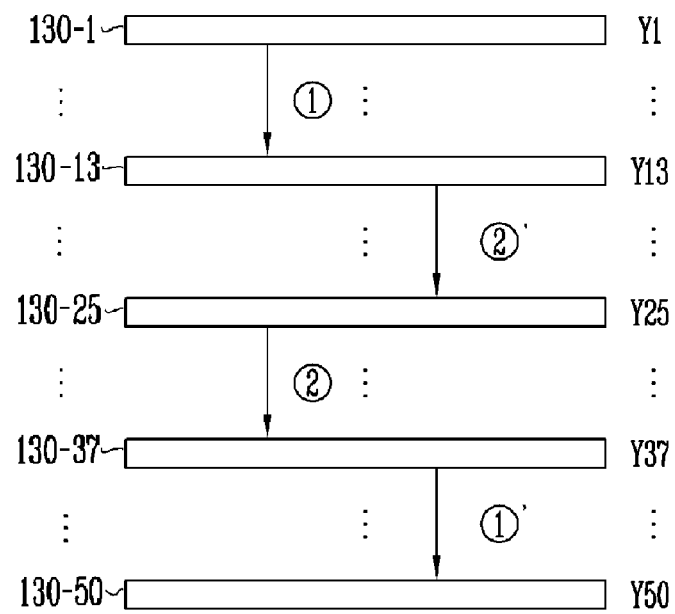

Referring to FIG. 10, the first electrodes 130-1 to 130-50 may be divided into four groups, that is, a first group, a second group, a third group, and a fourth group, and each two groups may be sensed, and the first group may include the first electrodes 130-1 to 130-13 corresponding to reference numeral ① of FIG. 10, the first electrodes 130-1 to 130-13 may correspond to the first sensing electrodes and the second sensing electrodes. The second group may include the first electrodes 130-37 to 130-50 corresponding to reference numeral ①' of FIG. 10, the first electrodes 130-25 to 130-37 may correspond to the third sensing electrodes and the fourth sensing electrodes.

Further, the third group may include the first electrodes 130-25 to 130-37 corresponding to reference numeral ② of FIG. 10, the first electrodes 130-25 to 130-37 may correspond to the first sensing electrodes and the second sensing electrodes. The fourth group may include the first electrodes 130-13 to 130-25 corresponding to reference numeral ②' of FIG. 10, the first electrodes 130-37 to 130-50 may correspond to the third sensing electrodes and the fourth sensing electrodes.

The first electrodes included in the first group and the second group may be first sensed, and the first electrodes included in the third group and the fourth group may be sensed after the sensing of the first and second groups.

Particularly, Y1, Y2, Y37, and Y38 may be sensed as the first to fourth output channels during the first sensing, Y2, Y3, Y38, and Y39 may be sensed as the first to fourth output channels during the second sensing, . . . , Y25, Y26, Y13, and Y14 may be sensed as the first to fourth output channels during the 13$^{th}$ sensing, . . . , and Y36, Y37, Y24, and Y25 may be sensed as the first to fourth output channels during the 24$^{th}$ sensing.

Figure 11:
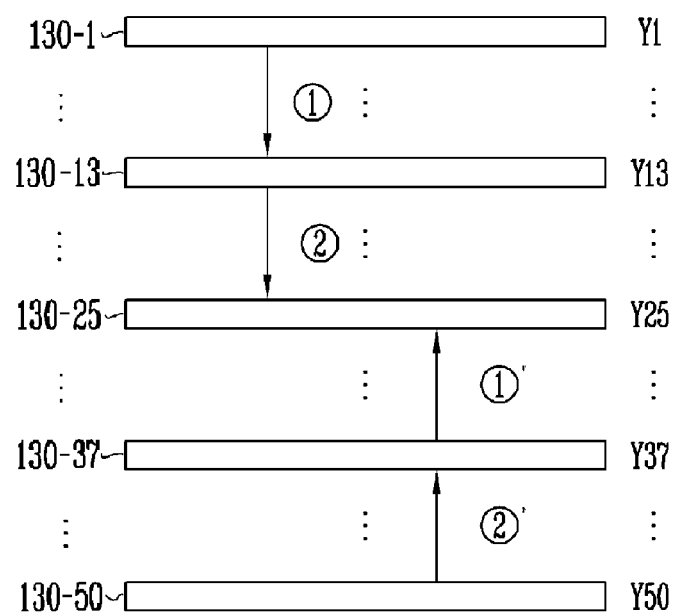

Referring to FIG. 11, the first electrodes 130-1 to 130-50 may be divided into four groups, that is, a first group, a second group, a third group, and a fourth group, and the groups may be sensed in pairs. The first group may include the first electrodes 130-1 to 130-13 corresponding to reference numeral ① of FIG. 11. The first electrodes 130-1 to 130-13 may correspond to the first sensing electrodes and the second sensing electrodes. The second group may include the first electrodes 130-25 to 130-37 corresponding to reference numeral ①' of FIG. 11, the first electrodes 130-25 to 130-37 may correspond to the third sensing electrodes and the fourth sensing electrodes.

Further, the third group may include the first electrodes 130-13 to 130-25 corresponding to reference numeral ② of FIG. 11, the first electrodes 130-25 to 130-37 may correspond to the first sensing electrodes and the second sensing electrodes. The fourth group may include the first electrodes 130-37 to 130-50 corresponding to reference numeral ②' of FIG. 11, the first electrodes 130-37 to 130-50 may correspond to the third sensing electrodes and the fourth sensing electrodes.

The first electrodes included in the first group and the second group may be first sensed, and the first electrodes included in the third group and the fourth group may be sensed after the sensing of the first electrodes in the first and second groups.

However, unlike the sequential sensing of the first and second sensing electrodes, the third and fourth sensing electrodes may also be sensed in a reverse order. That is, the first electrodes included in the first group and the third group may be sequentially sensed, and the first electrodes included in the second group and the fourth group may be sensed in a reverse order.

Particularly, Y1, Y2, Y37, and Y36 may be sensed as the first to fourth output channels during the first sensing, Y2, Y3, Y36, and Y35 may be sensed as the first to fourth output channels during the second sensing, . . . , Y13, Y14, Y50, and Y49 may be sensed as the first to fourth output channels during the 13$^{th}$ sensing, . . . , and Y24, Y25, Y38, and Y37 may be sensed as the first to fourth output channels during the 24$^{th}$ sensing.

Figure 12:
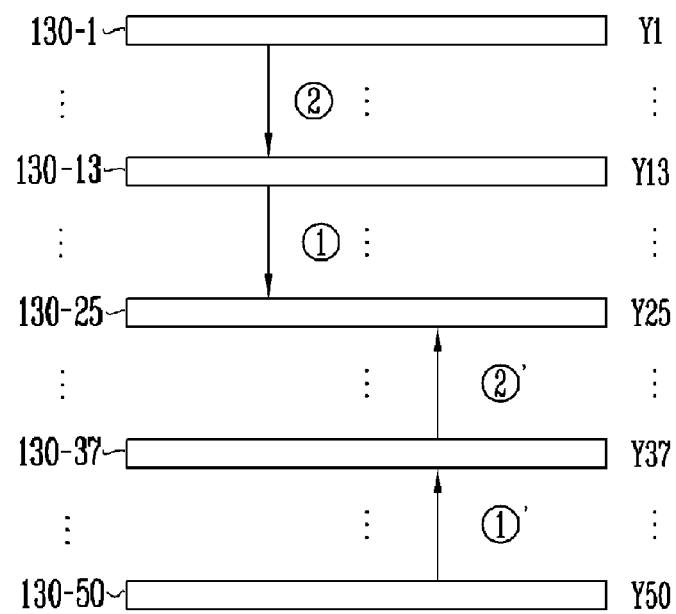

FIG. 12 illustrates a case where the third group and the fourth group illustrated in FIG. 11 are first sensed, and the first group and the second group are sensed later.

Referring to FIG. 12, Y13, Y14, Y50, and Y49 may be sensed as the first to fourth output channels during the first sensing, Y14, Y15, Y49, and Y48 may be sensed as the first to fourth output channels during the second sensing, . . . , Y1, Y2, Y37, and Y36 may be sensed as the first to fourth output channels during the 13$^{th}$ sensing, . . . , and Y2, Y3, Y36, and Y35 may be sensed as the first to fourth output channels during the 24$^{th}$ sensing.

That is, in the method of sensing the touch input according to the exemplary embodiment, the sensing order of the first electrode is not particularly limited.

Figure 13:
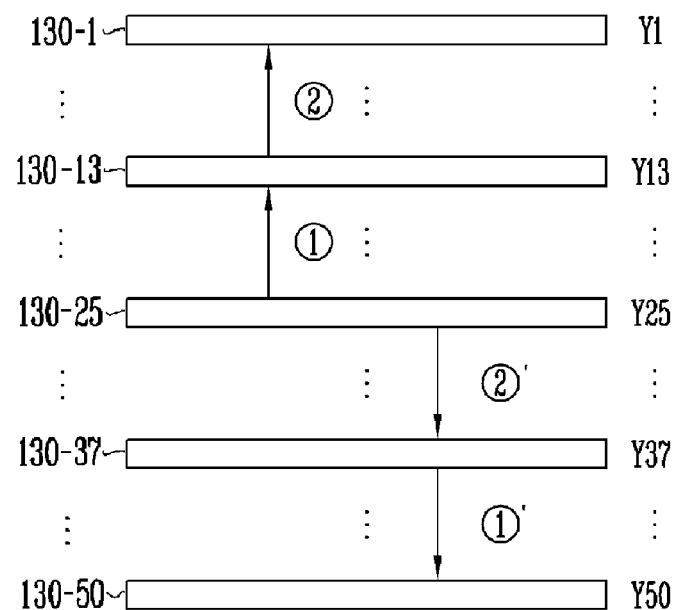

FIG. 13 is a diagram for describing a case where the third and fourth sensing electrodes are sequentially sensed, and then the first and second sensing electrodes are sensed. Compared to the embodiment of FIGS. 11 and 12, the paired sensing happens in reverse order in this embodiment, as indicated by the arrows.

That is, according to another exemplary embodiment, the first electrodes included in the first group and the third group may be sensed in a reverse order, and the first electrodes included in the second group and the fourth group may be sequentially sensed.

Referring to FIG. 13, Y25, Y24, Y37, and Y38 may be sensed as the first to fourth output channels during the first sensing, Y24, Y23, Y38, and Y39 may be sensed as the first to fourth output channels during the second sensing, . . . , Y13, Y12, Y25, and Y26 may be sensed as the first to fourth output channels during the 13$^{th}$ sensing, . . . , and Y2, Y1, Y36, and Y37 may be sensed as the first to fourth output channels during the 24$^{th}$ sensing.

Figure 14:
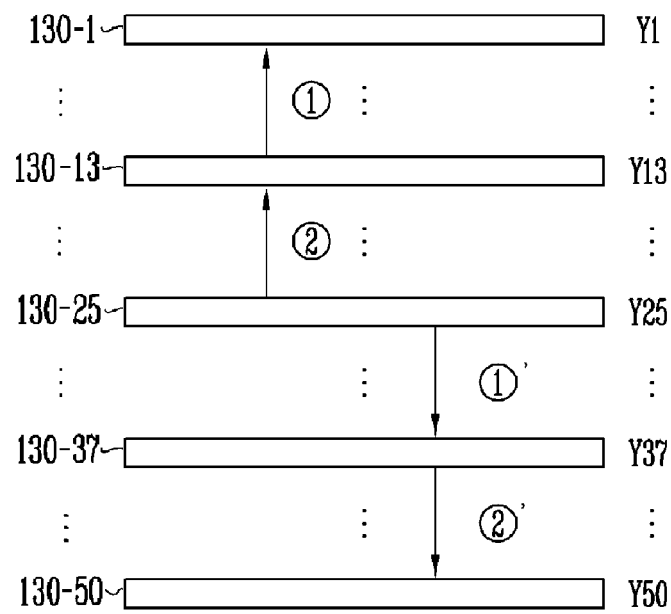

FIG. 14 illustrates a case where the third group and the fourth group illustrated in FIG. 13 are first sensed, and the first group and the second group are sensed later.

Referring to FIG. 14, Y13, Y12, Y25, and Y26 may be sensed as the first to fourth output channels during the first sensing, Y12, Y11, Y26, and Y27 may be sensed as the first to fourth output channels during the second sensing, . . . , Y25, Y24, Y37, and Y38 may be sensed as the first to fourth output channels during the 13$^{th}$ sensing, . . . , and Y14, Y13, Y49, and Y50 may be sensed as the first to fourth output channels during the 24$^{th}$ sensing.

As described with reference to FIGS. 8 to 14, the sensing electrode for the first electrodes may be changed.

The specified matters and embodiments and drawings such as specific apparatus drawings have been disclosed for illustrative purposes, and are not limiting of the inventive concept. Those skilled in the art will appreciate that various modifications, additions and substitutions are possible from the disclosure in the art to which the inventive concept belongs.

The spirit of the present disclosure and the concepts embodied therein is defined by the appended claims and the foregoing description, and all changes and modifications that fall within metes and bounds of the claims, or equivalents of such metes and bounds are intended to be embraced by the range of the spirit of the inventive concept.

What is claimed is:

1. A device for sensing a touch, comprising:
a plurality of electrodes; and
a sensing circuit connected with the plurality of electrodes by a plurality of output channels that correspond to the plurality of electrodes, wherein the sensing circuit is configured to sense a variation of capacitance of the plurality of electrodes from the plurality of output channels,
wherein the sensing circuit simultaneously senses output data output from a first output channel, a second output channel, a third output channel, and a fourth output channel among the plurality of output channels,
the second output channel is adjacent to the first output channel, and the fourth output channel is adjacent to the third output channel, and
the first to fourth output channels are connected to an input terminal of a comparing unit including a first input node and a second input node, and
wherein the first output channel and the third output channel are connected to the first input node of the comparing unit, and the second output channel and the fourth output channel are connected to the second input node of the comparing unit.

2. The device of claim 1, wherein the sensing circuit further includes a plurality of first capacitors, and
the plurality of first capacitors is provided between a first node of the first output channel and the input terminal of the comparing unit, between a second node of the second output channel and the input terminal of the comparing unit, between a third node of the third output channel and the input terminal of the comparing unit, and between a fourth node of the fourth output channel and the input terminal of the comparing unit.

3. The device of claim 2, wherein an operation polarity of a constant current source supplied to the first node is opposite to an operation polarity of a constant current source supplied to the second node.

4. The device of claim 3, wherein an operation polarity of a constant current source supplied to the first node is opposite to an operation polarity of a constant current source supplied to the third node.

5. The device of claim 4, wherein a first voltage corresponding to a difference between a voltage of the first node and a voltage of the third node is input into the first input node, and
a second voltage corresponding to a difference between a voltage of the second node and a voltage of the fourth node is input into the second input node.

6. The device of claim 5, wherein a signal corresponding to a difference between the first voltage and the second voltage is output to an output terminal of the comparing unit.

7. The device of claim 6, wherein the sensing circuit further includes a plurality of second capacitors, and
the plurality of second capacitors is provided between the first input node and the output terminal of the comparing unit and between the second input node and the output terminal of the comparing unit, and
an output signal of the output terminal is amplified by a ratio of capacitance of the first capacitor to capacitance of the second capacitor.

8. The device of claim 7, wherein the sensing circuit further includes an amplifier for amplifying the output signal of the comparing unit at the output terminal of the comparing unit.

9. The device of claim 1, wherein when the plurality of output channels is divided into a first group and a second group, which are targets of the first output channel and the second output channel, and a third group and a fourth group, which are targets of the third output channel and the fourth output channel, the sensing circuit senses the plurality of output channels included in the first group and the plurality of output channels included in the third group, and then senses the second group and the fourth group.

10. The device of claim 9, wherein the sensing circuit sequentially senses the plurality of output channels included in the first group and the third group so that the output channel sensed as the second output channel during the ith sensing (i is a natural number) is sensed as the first output channel during the i+1th sensing.

11. The device of claim 10, wherein the sensing circuit sequentially senses the plurality of output channels included in the second group and the fourth group so that the output channel sensed as the fourth output channel during the ith sensing (i is a natural number) is sensed as the third output channel during the i+1th sensing.

12. The device of claim 10, wherein the sensing circuit senses the plurality of output channels included in the second group and the fourth group in a reverse order so that the output channel sensed as the third output channel during the ith sensing (i is a natural number) is sensed as the fourth output channel during the i+1th sensing.

* * * * *

UNITED STATES PATENT AND TRADEMARK OFFICE
CERTIFICATE OF CORRECTION

PATENT NO. : 10,303,296 B2
APPLICATION NO. : 15/227307
DATED : May 28, 2019
INVENTOR(S) : Kyung Youl Min, Jun Yong Song and Gil Cho Ahn It is certified that error appears in the above-identified patent and that said Letters Patent is hereby corrected as shown below:

On the Title Page

Item (73) the name of the Assignee should read as "Samsung Display Co., Ltd." and "SOGANG UNIVERSITY RESEARCH FOUNDATION", not "Samsung Display Co., Ltd.".

Signed and Sealed this
Nineteenth Day of May, 2020

Andrei Iancu
*Director of the United States Patent and Trademark Office*